United States Patent [19]

Spanke et al.

[11] 3,860,100
[45] Jan. 14, 1975

[54] DRIVE UNIT FOR PRESSES

[75] Inventors: Edwin A. Spanke, Oak Forest; Louis F. Carrieri, La Grange Park; Melvin H. Francey, Palos Heights, all of Ill.

[73] Assignee: Gulf & Western Manufacturing Company, Southfield, Mich.

[22] Filed: Aug. 29, 1973

[21] Appl. No.: 392,667

[52] U.S. Cl............................ 192/18 A, 192/85 CA
[51] Int. Cl............................................. F16d 67/04
[58] Field of Search............ 192/18 A, 85 CA, 87.17

[56] References Cited
UNITED STATES PATENTS

| | | | |
|---|---|---|---|
| 2,667,248 | 1/1954 | Wissman | 192/18 A |
| 2,745,338 | 5/1956 | Wissman | 192/18 A |
| 2,836,270 | 5/1958 | Leopold | 192/85 CA |
| 3,182,776 | 5/1965 | Sommer | 192/18 A |
| 3,638,773 | 2/1972 | Lewis | 192/18 A |
| 3,797,623 | 3/1974 | Gregorovich et al. | 192/18 A |

*Primary Examiner*—Benjamin W. Wyche

[57] ABSTRACT

A brake and clutch type drive unit is disclosed for presses. The unit includes a housing supporting parallel laterally spaced apart input and output shafts for rotation relative thereto. Disc type brake and clutch assemblies concentric with the output shaft are axially spaced apart therealong and are alternately engageable to provide for rotation of the input shaft to rotate the output shaft at a slower speed and for the output shaft to be braked relative to the housing. The clutch and brake operating mechanism is air acutated, and actuation of the brake and clutch assemblies is mechanically interlocked to prevent an overlap in operation thereof.

9 Claims, 5 Drawing Figures

DRIVE UNIT FOR PRESSES

This invention relates to the art of transmissions and, more particularly, to a clutch and brake type transmission for driving large machinery, such as presses.

Brake and clutch type transmission or drive units have been provided heretofore for driving machinery such as presses. Such a drive unit includes a driven shaft having an output end coupled with an input gear through which the slide member of the press is driven relative to the press frame. The drive unit includes a clutch actuatable to impart rotation to the output shaft and a brake assembly actuatable to brake rotation of the output shaft. The shaft is generally driven through a flywheel which is rotated at relatively high speed by an electric drive motor and through an endless belt interconnecting the flywheel and motor.

Many brake and clutch drive units of the foregoing character have been provided heretofore and have included various hydraulic and pneumatic arrangements for operating the brake and clutch assemblies to control the output shaft. The pneumatic or hydraulic actuators are disposed within the housing for the drive unit and, often, fluid connections leading thereto have necessitated the use of passageways through the driven shaft and, accordingly, rotary air or hydraulic unions associated with a terminal end of the shaft. Such unions are not only expensive but are subject to wear during use of the unit, whereby air or hydraulic fluid leakage in the area of the seals eventually results. A further disadvantage of drive units heretofore provided resides in the fact that the output shaft is often directly coupled to the flywheel of the unit through the clutch mechanism, whereby the advantage of high speed flywheel rotation and high flywheel energy cannot be achieved without high speed rotation of the output shaft which may not be desired.

A further disadvantage of brake and clutch drive units heretofore provided, and of the character which are lubricated and cooled by internal liquid flow, resides in the fact that the clutch and brake operating mechanisms disposed within the drive unit housing change the internal volume of the housing during brake and clutch actuation. Therefore, care must be taken to assure that the housing is not full of lubricating and cooling fluid, or filled to the extent that the change in interior volume would prevent operation of the clutch and brake mechanisms or create undesirable internal pressure within the housing. Still a further disadvantage resides in the fact that the brake and clutch operating mechanisms are separately actuated and thereby subject to overlapping operation during disengagement of one and engagement of the other. Such overlapping operation is undesirable both from the standpoint of wear on the brake and clutch elements and the imposition of undesirable stresses on the components of the drive unit.

In accordance with the present invention, the foregoing disadvantages, and others, of clutch and brake units heretofore known are substantially overcome or avoided. In this respect, a clutch and brake drive unit is provided in which the brake and clutch assemblies are actuated by a fluid displaceable piston arrangement disposed within the drive unit housing and operable therein without changing the internal volume of the housing. Moreover, actuation of the piston arrangement is achieved independent of fluid passageways associated with the output shaft of the unit, whereby rotary seals and unions for the output shaft are eliminated.

Still further in accordance with the present invention, the output shaft is driven through a flywheel and clutch assembly arrangement which advantageously provides for the flywheel to be rotated at a high speed and the output shaft rotated at a lower speed to achieve the advantages of high flywheel energy together with low inertia of the output shaft and the brake and clutch components associated therewith. Operation of the brake and clutch assemblies is mechanically interlocked to prevent overlap in operation thereof, and operation of the brake and clutch assemblies through the fluid piston arrangement without changing the internal volume of the housing advantageously enables the drive unit to be run full of cooling and lubricating liquid. Moreover, as will become apparent hereinafter, the brake and clutch drive unit of the present invention is of a compact structure which enhances high production techniques to be used in connection with the manufacture of the unit and which facilitates mounting and dismounting of the drive unit relative to a machine to be driven therethrough.

It is accordingly an outstanding object of the present invention to provide an improved brake and clutch drive mechanism for machinery such as presses.

Another object is the provision of a brake and clutch drive unit in which the brake and clutcn components are actuated by a fluid operated piston arrangement disposed within the housing and actuatable without changing the internal volume of the housing.

Yet another object is the provision of a brake and clutch drive mechanism in which actuation of the brake and clutch components is mechanically interlocked to prevent an overlap in the operation thereof.

A further object is the provision of a brake and clutch drive mechanism of the foregoing character in which the output shaft is driven by a flywheel and through a clutch arrangement which enables high speed rotation of the flywheel and lower rotational speed of the output shaft.

A still further object is the provision of a brake and clutch drive unit which is of compact construction, permits high production techniques in the manufacture thereof, is readily mountable and dismountable with respect to a machine to be driven thereby, and which is constructed of a minimum number of parts subject to wear during use thereof.

The foregoing objects, and others, will in part be obvious and in part pointed out more fully hereinafter in conjunction with the written description of a preferred embodiment illustrated in the accompanying drawings in which.

Figure 1:
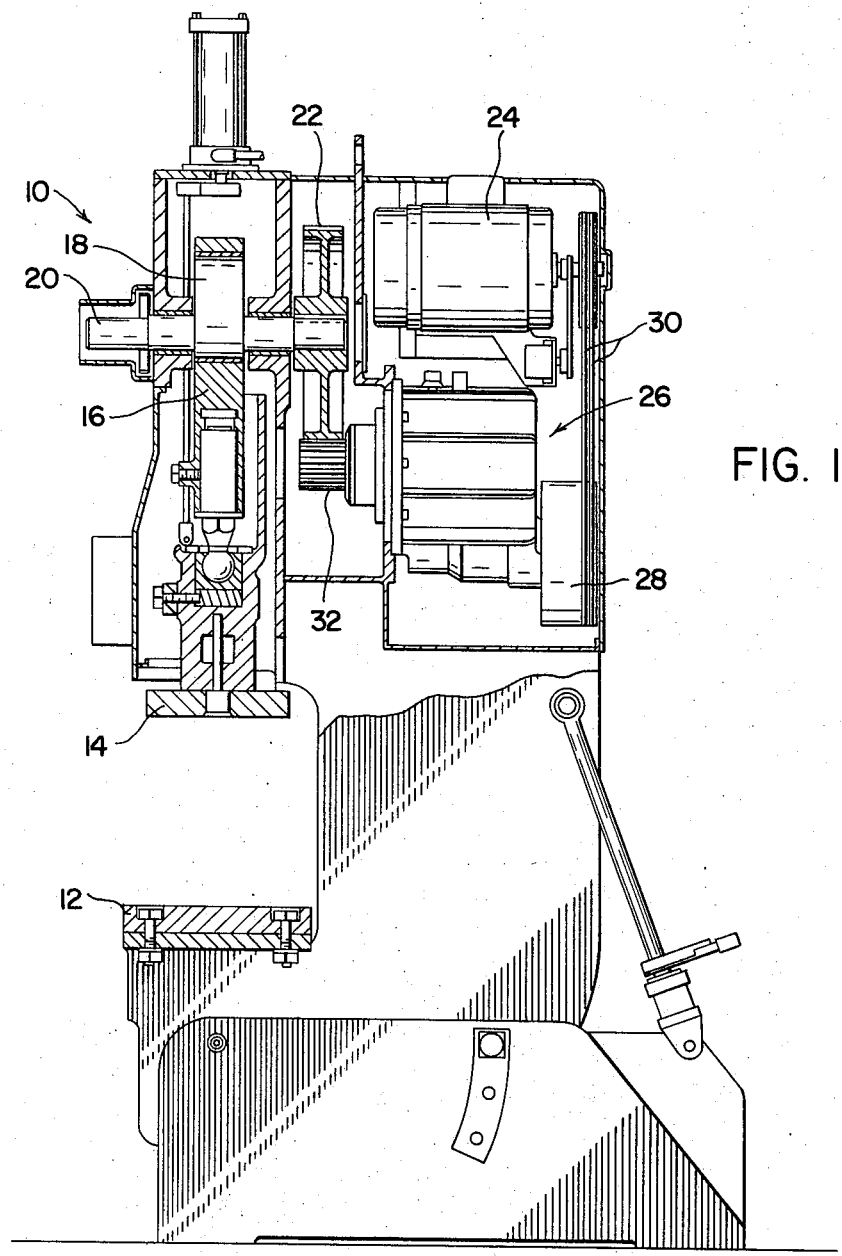
FIG. 1 is an elevation view, partially in section, of a metalworking press having a drive unit of the present invention associated therewith.

Referring now in greater detail to the drawings wherein the showings are for the purpose of illustrating a preferred embodiment of the invention only and not for the purpose of limiting the invention, a metalworking press is illustrated in FIG. 1 of the drawing and is designated generally by the numeral 10. The press includes a frame structure suppporting a fixed platen 12 and a vertically reciprocable platen 14 which is suitably interconnected with a crank link 16 having its upper end rotatably interconnected with crank arm 18 of a crank member having a shaft 20 suitably supported by the press frame for rotation relative thereto. One end of crankshaft 20 has a gear 22 keyed or otherwise secured thereto, whereby rotation of gear 22 rotates crank arm 18 to impart reciprocating movement to platen member 14 through link 16.

Gear 22 is rotated by an electric motor 24 through brake and clutch unit 26, both of which are removably interconnected with the press frame. Drive unit 26 includes a flywheel 28, and motor 24 and drive unit 26 are operatively interconnected by endless belts 30 extending about the flywheel and a pulley or the like on the drive shaft of motor 24. Drive unit 26 includes a pinion 32 in meshhing engagement with press gear 22 for imparting rotation thereto. As described more fully hereinafter, drive unit 26 includes clutch and brake assemblies operable selectively to rotate or brake rotation of pinion 32 to reciprocate and stop reciprocation of press platen 14, respectively.

Drive unit 26 is illustrated in detail in FIGS. 2-5. With reference to these figures it will be seen that the drive unit includes a housing comprised of a tubular wall portion 34 and end walls 36 and 38 at axially opposite ends of wall 34. In the embodiment illustrated, end wall 36 is integral with wall 34, and end wall 38 is a separate component suitably interconnected with wall 34 such as by a plurality of circumferentially spaced apart bolts 40. Drive unit 26 is adapted to be removably mounted on the press and, for this purpose, housing wall 34 and support flange 42 of the press frame are provided with a plurality of circumferentially spaced apart and aligned openings to receive corresponding mounting bolts 44.

An output shaft 46 is supported within the housing for rotation relative thereto and has an output end extending through a flanged opening 39 provided therefor in end wall 38 of the housing. The output end of shaft 46 carries pinion 32 which may be integral therewith or a separate component suitably attached thereto. While a pinion is shown at the output end of shaft 46, it will be appreciated that other components such as couplings can be associated with the output end for interconnecting the output shaft with a component to be driven thereby. Output shaft 46 is supported for rotation relative to the housing by bearing assemblies 48 and 50 at opposite ends thereof. More particularly, bearing assembly 48 is a roller bearing unit interposed between shaft 46 and flanged opening 39 in end wall 38 of the housing, and bearing assembly 50 is a roller bearing unit interposed between the corresponding end of shaft 46 and an annular support ring 52 mounted on end wall 36 of the housing by means of a plurality of bolts 54. Support ring 52 serves a further purpose set forth hereinafter. A removable bearing retainer and seal assembly 49 surrounds the output end of shaft 46 and is secured to the flange of opening 39 in end wall 38 of the housing to axially retain bearing assembly 48 and to peripherally seal the output shaft and housing against fluid leakage.

An input shaft 56 is supported by the housing for rotation relative thereto and includes an input end extending through a flanged opening 37 provided therefor in end wall 36 of the housing. Flywheel 28 is keyed or otherwise interconnected with the input end of shaft 56 so that rotation of the flywheel imparts rotation to the input shaft. Input shaft 56 is parallel to and laterally offset from output shaft 46 and, in the embodiment illustrated, the input shaft is disposed vertically below the output shaft.

Input shaft 56 is supported for rotation relative to the housing by bearing assemblies 58 and 60. Bearing assembly 58 is a roller bearing unit interposed between shaft 56 and the the inner periphery of a shaft cavity 62 provided in housing wall 34, and bearing assembly 60 is a roller bearing unit interposed between shaft 56 and flange opening 37 in end wall 36 of the housing. A removable bearing retainer and seal unit 64 surrounds the input end of shaft 56 and is secured to the flange surrounding opening 37 to axially retain bearing assembly 60 and peripherally seal the shaft and housing against fluid leakage.

Input shaft 56 is provided intermediate its opposite ends with a pinion gear 66 which may be integral with the shaft or a separate component suitably attached thereto for rotation therewith. The teeth of pinion 66 mesh with the teeth of an annular ring gear 68 which is coaxial with output shaft 46 and is disposed in surrounding relationship with respect to support ring 52. Ring gear 68 is supported for rotation relative to the drive unit housing and shaft 46 by a bearing assembly 70 interposed between the inner periphery of the ring gear and the outer periphery of support ring 52. Ring gear 68 is of a larger diameter than pinion 66, whereby rotation of pinion 66 in response to rotation of flywheel 28 imparts rotation to ring gear 68 relative to the housing and at a rotational speed less than that of pinion 66.

As will become apparent hereinafter, rotation of ring gear 68 is adapted to impart rotation to output shaft 46 through a clutch assembly 72, and that rotation of output shaft 46 is adapted to be braked upon release of the clutch and engagement of a brake assembly 74. Alternate actuation of the clutch and brake assemblies is achieved by a fluid operated piston assembly including an axially displaceable annular piston member 76, an annular clutch presser member 78, and an annular brake presser member 80.

Figure 3:
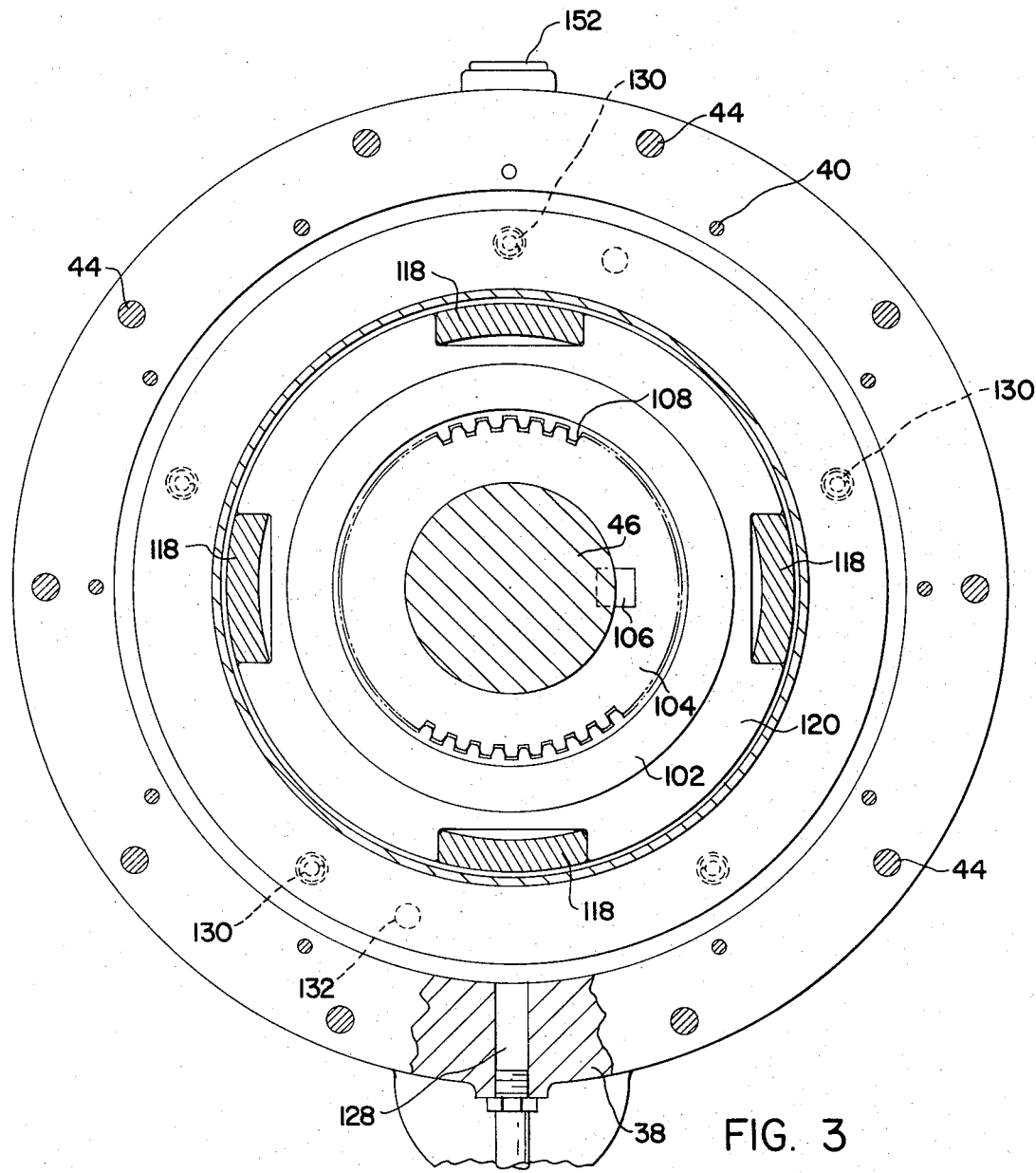
FIG. 3 is a view in transverse cross section of the drive unit illustrated in FIG. 2, the section being along line 3—3 in FIG. 2.
Figure 4:
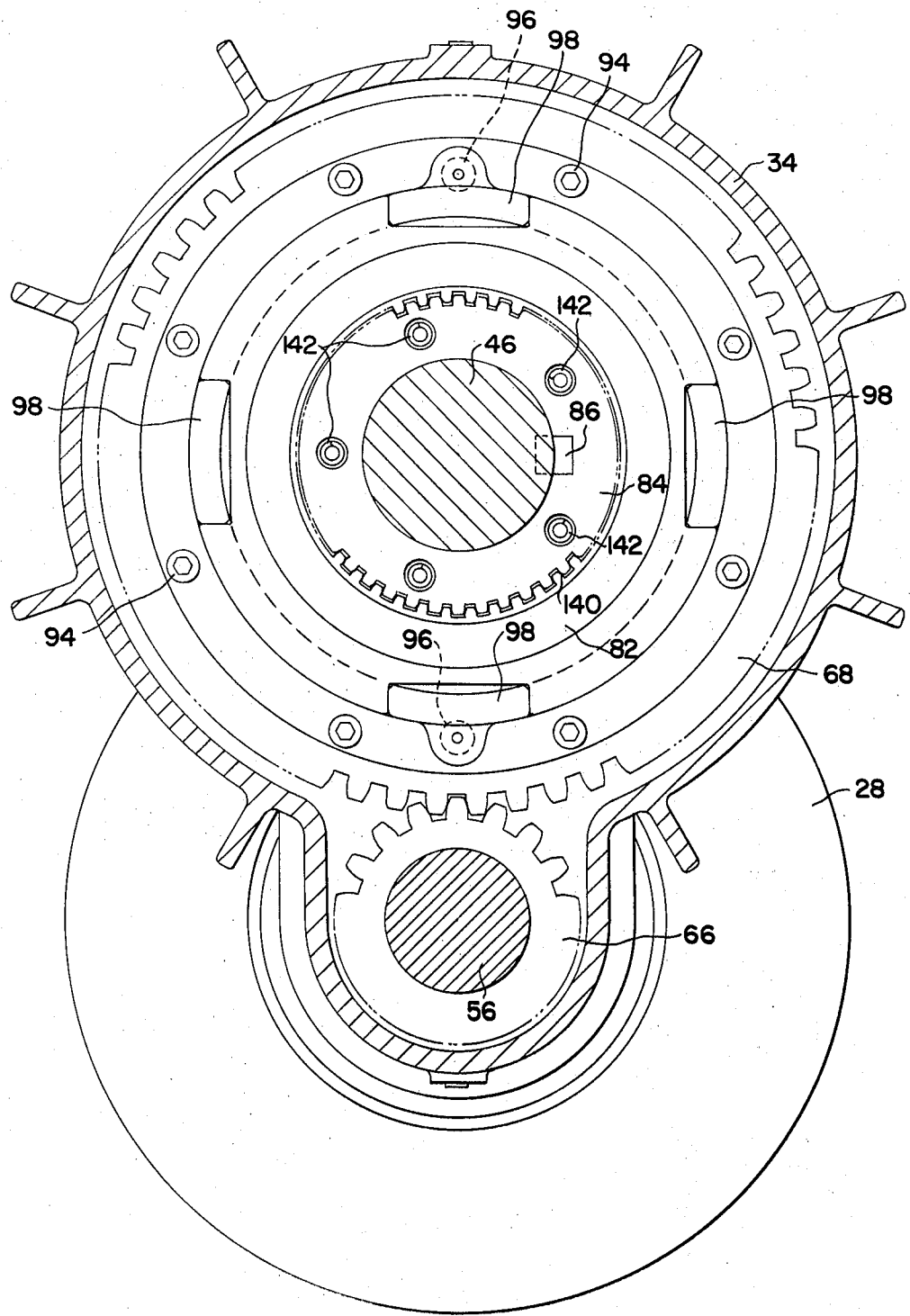
FIG. 4 is a view in transverse cross section of the drive unit illustrated in FIG. 2, the section being along line 4—4 in FIG. 2; and, FIG. 5 is a detailed elevation view, in section, of a portion of the brake, clutch and input shaft components of the drive unit illustrated in FIG. 2.
Figure 5:
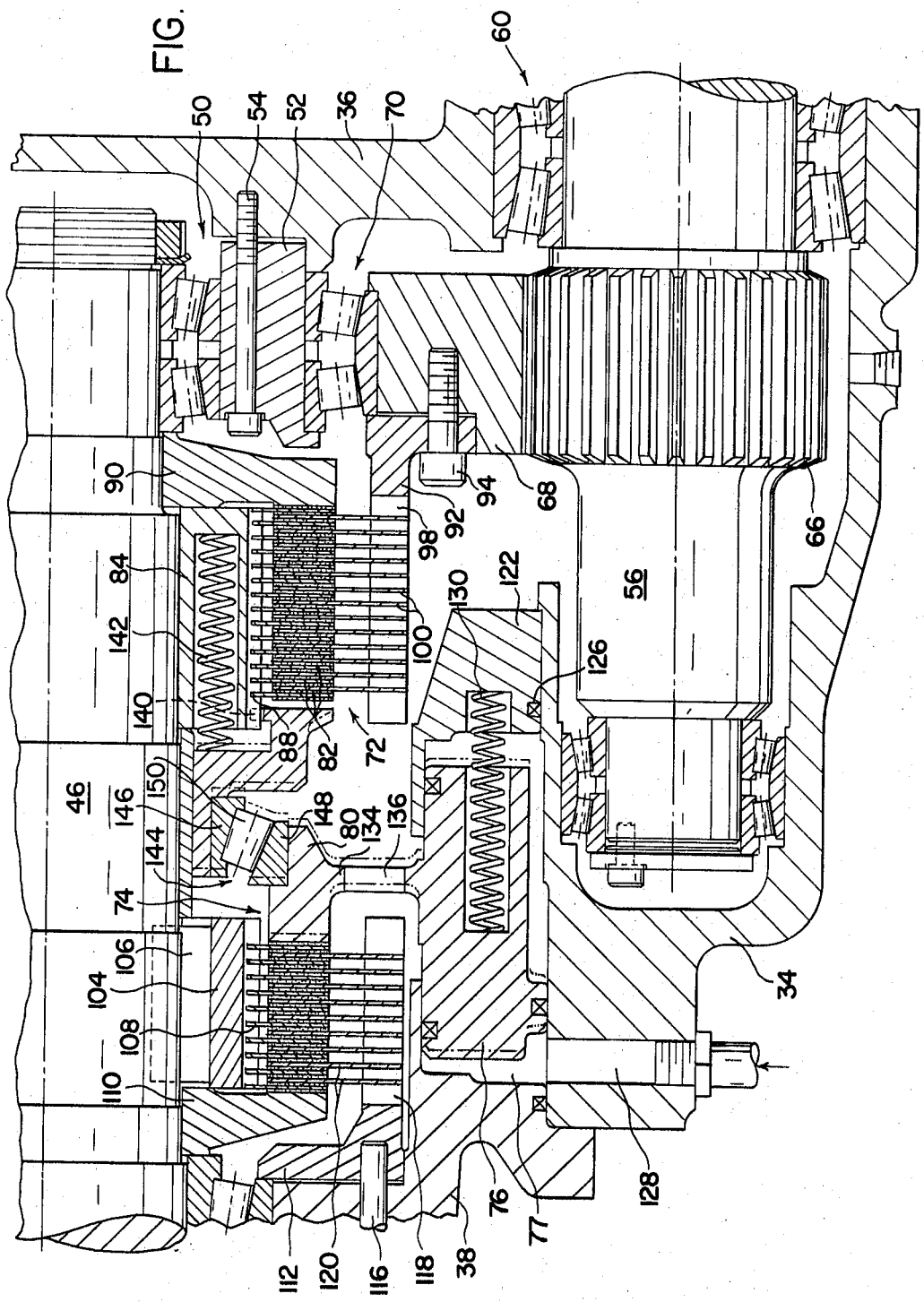

The structure of the clutch and brake assemblies and the actuator assembly is best illustrated in FIGS. 3-5 of the drawing. In this respect, clutch assembly 72 is comprised of a plurality of clutch discs 82 mounted on output shaft 46 for rotation therewith and axial sliding movement relative thereto. More particularly, an annular clutch rotor 84 surrounds shaft 46 and is interconnected therewith such as by a key 86 for rotation with the shaft. The outer periphery of rotor 84 and the inner peripheries of clutch discs 82 are interengaged such as by a splined interconnection 88, whereby clutch discs 82 rotate with output shaft 46 and are axially slideable relative thereto. A clutch abutment plate 90 is secured to shaft 46 for rotation therewith and is axially fixed with respect to shaft 46 at the axially outer end of the clutch discs 82.

An annular flanged ring 92 extends about the inner periphery of ring gear 68 and is mounted thereon such as by a plurality of circumferentially spaced apart bolts 94. The flange of ring 92 and ring gear 68 are each provided about the peripheries thereof with a pair of diametrically opposed apertures for receiving dowel pins 96 which serve to achieve proper alignment between ring 92 and gear 68 during assembly thereof. Ring 92 is further provided about its periphery with diametrically opposed pairs of axially extending clutch disc support fingers 98. Fingers 98 support a plurality of clutch discs 100 each of which is interposed between a pair of the clutch discs 82. The outer peripheries of clutch discs 100 are notched to slideably receive fingers 98, whereby discs 100 are rotatable with support ring 92 and are axially slideable relative thereto and to fixed abutment plate 90 on output shaft 46. As will be described more fully hereinafter, clutch presser plate member 78 is axially displaceable toward abutment plate 90 to press clutch discs 82 and 100 thereagainst to achieve clutch engagement.

From the foregoing description, it will be appreciated that rotation of input shaft 56 imparts rotation to ring gear 68 which in turn rotates clutch discs 100 relative to the drive unit housing and relative to output shaft 46 when the clutch is disengaged. When clutch presser plate 78 is displaced toward fixed abutment plate 90 the clutch is engaged and output shaft 46 rotates with ring gear 68.

Brake assembly 74 is comprised of a plurality of brake discs 102 interconnected with output shaft 46 for rotation therewith and axial displacement relative thereto. More particularly, an annular brake rotor 104 surrounds output shaft 46 and is interconnected therewith such as by a key 106 for rotation with the shaft. Rotor 104 is axially fixed with respect to shaft 46, and the outer periphery of the rotor and the inner peripheries of brake discs 102 are interengaged such as by a splined interconnection 108, whereby discs 102 are rotatable with the output shaft and are axially displaceable relative thereto.

Output shaft 46 carries a fixed brake abutment plate 110 at the axially outer end of brake discs 102, which abutment plate is keyed or otherwise interconnected with shaft 46 for rotation therewith. End wall 38 of the drive unit housing is provided with an annular support ring 112 which is secured to the end wall such as by a plurality of circumferentially spaced apart bolts 114. Ring 112 and end wall 38 are each provided with a pair of diametrically opposed recesses adapted to receive dowel pins 116 which assure proper alignment between the ring and end wall during assembly thereof. Support ring 112 further includes diametrically opposed pairs of axially extending support fingers 118 for supporting a plurality of brake discs 120 each of which is interposed between a pair of brake discs 102. The outer peripheries of brake discs 120 are notched to slideably receive fingers 118, whereby brake discs 120 are supported against rotation relative to the housing and for axial displacement relative thereto and relative to output shaft 46.

As described more fully hereinafter, brake presser plate member 80 is displaceable to press brake discs 102 and 120 toward fixed abutment plate 110 to brake rotation of output shaft 46. In this respect, it will be appreciated that during clutched rotation of output shaft 46 brake discs 102 rotate relative to brake discs 120 and that upon clutch disengagement and displacement of presser plate 80 toward abutment plate 110 and brake discs are compressed between the abutment plate to stop shaft rotation.

Figure 2:
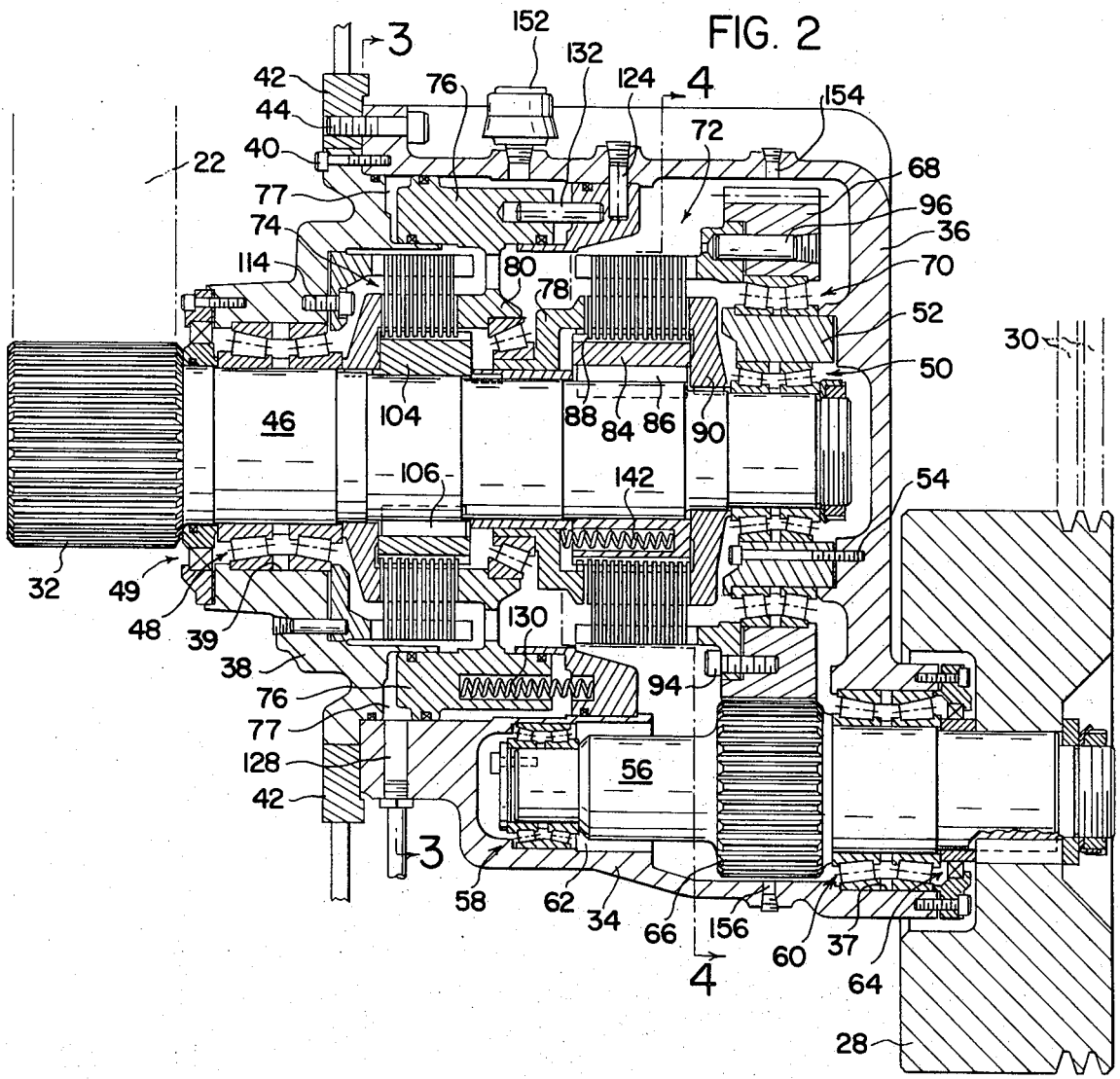
FIG. 2 is a sectional elevation view of the drive unit illustrated in FIG. 1.

As mentioned hereinabove, the clutch and brake actuating piston assembly is comprised of axially displaceable annular piston member 76 and annular presser plates 78 and 80. Piston member 76 is coaxial with output shaft 46 and has its axially opposite ends disposed in an annular piston cylinder or chamber 77 defined in part by housing walls 34 and 38 and in part by an annular chamber component 122 axially fixed to housing wall 34 such as by a plurality of radially extending dowel pins 124, one of which is illustrated in FIG. 2. A suitable seal 126 is interposed between the outer periphery of chamber component 122 and the inner periphery of housing wall 34 to seal against fluid leakage therebetween. Similarly, the radially inner and outer surfaces of piston member 76 carry sealing elements, not designated numerically, for sealing the respective areas of engagement between the piston and piston cylinder.

Piston member 76 is adapted to be axially displaced in the direction from the brake assembly toward the clutch assembly by air or other fluid under pressure entering piston chamber 77 through an inlet port 128 in housing wall 34. It will be appreciated that inlet port 128 is adapted to be connected to a suitable source of fluid under pressure, not illustrated. Further, piston member 76 is adapted to be biased axially in the direction from the clutch assembly toward the brake assembly by a plurality of compression springs 130 circumferentially spaced apart about the piston member and having opposite ends disposed in corresponding recesses provided in the piston member and in the chamber component 122. Piston member 76 and cylinder component 122 are further provided with corresponding pairs of diametrically opposed recesses adapted to receive dowel pins 132 which restrain rotation of piston member 76 relative to the drive unit housing.

Brake presser plate 80 is concentric with respect to output shaft 46 and is integrally interconnected with piston member 76 such as by a radially extending web 134, whereby presser plate 80 is axially displaceable with piston member 76. Web portion 134 is provided with openings 136 therethrough to facilitate axial displacement of presser plate 80 independent of any resistance from oil or other lubricating and cooling fluid within the housing.

Clutch presser plate 78 is concentric with output shaft 46 and is mounted thereon for rotation therewith and axial sliding displacement relative thereto. More particularly, sliding displacement is provided by means of a bearing sleeve 138 interposed between shaft 46 and presser plate 78, and rotation of the presser plate with shaft 46 is provided by means of an axially slideable splined interconnection 140 between the presser plate and clutch rotor component 84. Clutch rotor 84 is provided about its periphery with a plurality of axially extending recesses receiving compression springs 142 which engage clutch presser plate 78 and bias the latter in the direction from the clutch assembly toward the brake assembly.

A bearing assembly 144 is interposed between presser plates 78 and 80 to interengage the presser plates for relative rotation. Further, bearing assembly 144 together with compression springs 142 provide for presser plate 78 to be displaced in axially opposite directions simultaneously with the axial displacement of presser plate 80. More particularly, outer and inner bearing races 146 and 148 are carried by presser plates 78 and 80, respectively, and a plurality of roller bearings 150 are axially and radially captured therebetween for rolling engagement therewith. Relative rotation is required, of course, since presser plate 80 is rotatably fixed relative to output shaft 46 while presser plate 78 is rotatable with the output shaft.

In operation of the clutch and brake actuating assembly, the components in the solid positions thereof illustrated in FIG. 5 are positioned for the brake to be engaged and the clutch disengaged. Accordingly, presser plate 80 is biased toward fixed abutment plate 110 by compression springs 130 to effect brake engagement, and the disc engaging face of clutch presser plate 78 is axially spaced from the adjacent clutch disc 82. Therefore, rotation of ring gear 68 through input shaft 56 causes the ring gear and clutch plates 100 associated therewith to rotate relative to output shaft 46 and clutch discs 82 interconnected therewith.

When it is desired to rotate output shaft 46, air or other fluid under pressure is introduced into piston chamber 77 through inlet passage 128 to axially displace piston member 76, presser plate 80 and presser plate 78 to the broken line positions thereof illustrated in FIG. 5. Such axial displacement of the piston member and presser 78 is against the bias of the corresponding compression springs 130 and 142. When so displaced, the disc engaging face of presser plate 80 is axially spaced from the adjacent brake disc 102, and the engaging face of clutch presser plate 78 presses clutch disc 82 and 100 toward fixed abutment place 90 to effect clutch engagement. Accordingly, rotation of ring gear 68 through input shaft 56 rotates output shaft 46 through the interengaged clutch discs 82 and 100, presser plate 78 rotates relative to presser plate 80 through bearing assembly 144, and brake discs 102 carried by shaft 46 rotate relative to brake discs 120.

Clutch engagement is maintained until such time as the fluid pressure in piston chamber 77 is relieved. Upon release of fluid pressure from chamber 77, compression springs 130 and 142 cooperate to bias the piston and presser plate components in the direction from the clutch assembly toward the brake assembly to effect disengagement of the clutch and engagement of the brake.

With reference to FIG. 2, a breather cap 152 opens the piston chamber behind piston member 76 to atmosphere to enable free axial displacement of the piston member. The opening to the piston chamber behind the piston member can, if desired, be used to advantage to apply additional braking pressure to supplement the pressure of springs 130 and 142. In this respect, the opening can be connected to a suitable source of fluid under pressure which can be introduced into the piston chamber to bias the piston in the direction from the clutch assembly toward the brake assembly. It will be further appreciated that such fluid pressure application to the piston member can be employed to prevent unintentional actuation of the piston member in the direction to cause clutch engagement.

The use of two sets of compression springs 130 and 142 to achieve axial braking force minimizes the force exerted on bearing assembly 144 during clutch engagement. Further, the spring arrangement provides a minimum load on bearing assembly 144 during axial displacement of the presser members corresponding to the force of springs 142, thus to prevent relative axial displacement between the outer and inner bearing races.

It will be appreciated from the foregoing description of the clutch and brake actuating piston assembly that presser plates 78 and 80 are mechanically interlocked to prevent an overlap in clutch and brake operation upon disengagement of one and engagement of the other. Still further, it will be appreciated that axial displacement of the piston member and presser plates 78 and 80 is achieved without changing the internal volume of the housing of the drive unit. Accordingly, the housing can be filled during use with a cooling and lubricating liquid such as oil without affecting operation of the internal components of the unit. The piston member and piston cylinder therefor are sealed against leakage of such liquid into the chamber, whereby the piston can be air actuated while a hydraulic fluid such as oil is employed for cooling and lubricating purposes. Bearing retainer and sealing assemblies 49 and 64 likewise prevent leakage or lubricating and cooling fluid from the housing along the corresponding output and input shaft members. Preferably, cooling and lubricating liquid is circulated through the housing, is externally cooled and then recirculated through the housing. It will be appreciated that suitable inlet and outlet openings, such as openings 154 and 156 in FIG. 2, can be employed for this purpose if circulation of the liquid is desired.

It will be further appreciated from the foregoing description of the clutch and brake drive unit that the input shaft driven ring gear 68 supporting disc elements 100 of the clutch assembly advantageously provides for high speed rotation of input shaft 56 to impart a slower rotational speed to output shaft 46. This enables a reduction in the size of flywheel 28 to reduce the overall size of the drive unit while retaining the desirable high flywheel energy as a result of high speed rotation thereof.

As many possible embodiments of the present invention may be made and as many possible changes may be made in the embodiment herein illustrated and described, it is to be distinctly understood that the foregoing descriptive matter is to be interpreted merely as illustrative of the present invention and not as a limitation.

Having thus described the invention, we claim:

1. A press drive mechanism comprising a housing, an input shaft supported in said housing for rotation about a first axis, an output shaft supported in said housing for rotation about a second axis offset from and parallel to said first axis, clutch means for operatively connecting said input and output shafts, said clutch means including a clutch abutment plate on said output shaft and interposed first and second clutch disc means, said first clutch disc means being carried by said output shaft for rotation therewith, means separate from said input shaft supporting said second clutch disc means for rotation relative to said housing, means interconnecting said second clutch disc support means with said input shaft for said second clutch disc means to be rotated in response to rotation of said input shaft and at a rotational speed less than said input shaft, brake means for said output shaft, said brake means including a brake abutment plate on said output shaft and interposed first and second brake disc means, said first brake disc means being carried by said output shaft for rotation therewith and said second brake disc means being supported by said housing against rotation, said clutch disc means and said brake disc means being axially spaced apart relative to said output shaft to provide an axial space between the axially inner ones of said clutch and brake disc means, annular clutch presser plate and brake presser plate members in said axial space, an annular fluid actuated piston concentric with said output shaft and extending about said clutch and brake disc means, means including annular cylinder means in said housing supporting said piston for axial displacement relative to said output shaft and against rotation relative to said housing, means interconnecting said brake presser plate member with said piston for axial displacement therewith, said clutch presser plate member being mounted on said output shaft for rotation therewith and for axial displacement relative thereto, said brake and clutch presser plate members having radially spaced overlapping portions in said axial space, bearing means between and radially interengaging said overlapping portions, said piston moving said brake and clutch presser plate members in the axial direction to displace said clutch presser plate member toward said clutch abutment plate to actuate said clutch means in response to the introduction of fluid under pressure into said cylinder means, and means biasing said piston and said clutch and brake presser plate members to move in the direction to displace said brake presser plate member toward said brake abutment plate to actuate said brake means upon release of fluid pressure from said cylinder means.

2. The mechanism according to claim 1, wherein said biasing means is spring means including first spring elements disposed between said piston and said housing and second spring elements disposed between said clutch presser plate and said clutch abutment plate.

3. The mechanism according to claim 1, wherein said housing is closed to receive cooling and lubricating fluid and said cylinder means includes axially opposed cylinder portions receiving axially opposite ends of said annular piston member.

4. The mechanism according to claim 3, wherein said biasing means includes first spring elements disposed between said piston and said housing and second spring elements disposed between said clutch presser plate and said clutch abutment plate.

5. The mechanism according to claim 4, wherein said means supporting said second clutch disc means for rotation includes gear means concentric with said output shaft and rotatably supported by said housing, said gear means carrying said second clutch disc means for rotation therewith, and said means interconnecting said second clutch disc support means and said input shaft is pinion means on said input shaft in meshing engagement with said gear means.

6. A press drive mechanism comprising a housing closed to receive cooling and lubricating fluid, an input shaft supported in said housing for rotation about a first axis, an output shaft supported in said housing for rotation about a second axis offset from and parallel to said first axis, clutch means for operatively connecting said input and output shafts, said clutch means including a clutch abutment plate on said output shaft and interposed first and second clutch disc means, siid first clutch disc means being carried by said output shaft for rotation therewith, means supporting said second clutch disc means for rotation relative to said housing, means interconnecting said second clutch disc support means with said input shaft for said second clutch disc means to be rotated in response to rotation of said input shaft and at a rotational speed less than said input shaft, brake means for said output shaft, said brake means including a brake abutment on said output shaft and interposed first and second brake disc means, said first brake disc means being carried by said output shaft for rotation therewith and said second brake disc means being supported by said housing against rotation, actuating means to alternately actuate said clutch and brake means, said actuating means including an annular fluid actuated piston in said housing concentric with said output shaft and extending about said clutch and brake disc means, axially opposed cylinder portions in said housing receiving axially opposite ends of said piston and supporting said piston for displacement in axially opposite directions, and presser plate means interconnected with said piston for movement therewith in said opposite directions to operatively interengage said clutch and brake disc means respectively with said clutch and brake abutment plates.

7. The mechanism according to claim 6, and spring means biasing said piston in the axial direction for said presser plate means to operatively interengage said brake disc means with said brake abutment plate.

8. The mechanism according to claim 7, wherein said spring means includes first spring elements between said piston and said housing and second spring elements between said presser plate means and said clutch abutment plate.

9. The mechanism according to claim 8, wherein said means supporting said second clutch disc means for rotation relative to said housing includes gear means concentric with said output shaft and rotatably supported by said housing, said gear means carrying said second clutch disc means for rotation therewith, and said means interconnecting said second clutch disc support means and said input shaft is pinion means on said input shaft in meshing engagement with said gear means.

* * * * *